United States Patent
Shibano et al.

(10) Patent No.: US 10,749,183 B2
(45) Date of Patent: *Aug. 18, 2020

(54) ELECTRODE FOR ENERGY STORAGE DEVICES

(71) Applicant: NISSAN CHEMICAL INDUSTRIES, LTD., Tokyo (JP)

(72) Inventors: Yuki Shibano, Funabashi (JP); Tatsuya Hatanaka, Funabashi (JP); Takuji Yoshimoto, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/068,544

(22) PCT Filed: Dec. 21, 2016

(86) PCT No.: PCT/JP2016/088013
§ 371 (c)(1),
(2) Date: Jul. 6, 2018

(87) PCT Pub. No.: WO2017/119287
PCT Pub. Date: Jul. 13, 2017

(65) Prior Publication Data
US 2019/0020038 A1 Jan. 17, 2019

(30) Foreign Application Priority Data

Jan. 7, 2016 (JP) .................... 2016-001842

(51) Int. Cl.
*H01M 4/66* (2006.01)
*H01G 11/28* (2013.01)
(Continued)

(52) U.S. Cl.
CPC .......... *H01M 4/667* (2013.01); *H01G 11/28* (2013.01); *H01G 11/36* (2013.01); *H01G 11/38* (2013.01);
(Continued)

(58) Field of Classification Search
CPC .... H01M 10/0525; H01M 4/13; H01M 4/131; H01M 4/1391; H01M 4/366; H01M 4/48;
(Continued)

(56) References Cited

U.S. PATENT DOCUMENTS 5,721,069 A * 2/1998 Shoji ............... H01M 4/0404
204/290.11
2009/0181309 A1* 7/2009 Kwon .................. H01M 4/13
429/232

(Continued)

FOREIGN PATENT DOCUMENTS

JP 2001-143702 A 5/2001
JP 2013-033685 A 2/2013
(Continued)

OTHER PUBLICATIONS

Tan, S. H., et. al. "Functionalization of Multi-Walled Carbon Nanotubes with Poly(2-ethyl-2-oxazoline)", Macromol. Symp., 249-250: 270-275, published Mar. 28, 2007. (Year: 2007).*

(Continued)

*Primary Examiner* — Miriam Stagg
*Assistant Examiner* — Lilia Nedialkova
(74) *Attorney, Agent, or Firm* — Birch, Stewart, Kolasch & Birch, LLP

(57) ABSTRACT

Provided is an electrode for energy storage devices, which is provided with: a collector substrate; an undercoat layer that is formed on at least one surface of the collector substrate and contains carbon nanotubes; and an active material layer that is formed on the surface of the undercoat layer and (Continued)

contains an active material which contains a titanium-containing oxide.

8 Claims, 1 Drawing Sheet

(51) Int. Cl.

| | | |
|---|---|---|
| *H01G 11/36* | (2013.01) | |
| *H01G 11/46* | (2013.01) | |
| *H01G 11/86* | (2013.01) | |
| *H01G 11/70* | (2013.01) | |
| *H01M 4/48* | (2010.01) | |
| *H01M 4/131* | (2010.01) | |
| *H01M 4/62* | (2006.01) | |
| *H01M 4/1391* | (2010.01) | |
| *H01G 11/68* | (2013.01) | |
| *H01G 11/38* | (2013.01) | |
| *H01M 4/13* | (2010.01) | |
| *H01M 4/36* | (2006.01) | |
| *H01M 10/0525* | (2010.01) | |

(52) U.S. Cl.
CPC .............. *H01G 11/46* (2013.01); *H01G 11/68* (2013.01); *H01G 11/70* (2013.01); *H01G 11/86* (2013.01); *H01M 4/13* (2013.01); *H01M 4/131* (2013.01); *H01M 4/1391* (2013.01); *H01M 4/366* (2013.01); *H01M 4/48* (2013.01); *H01M 4/483* (2013.01); *H01M 4/62* (2013.01); *H01M 4/663* (2013.01); *H01M 4/668* (2013.01); *H01M 10/0525* (2013.01); *Y02E 60/13* (2013.01)

(58) Field of Classification Search
CPC ........ H01M 4/483; H01M 4/62; H01M 4/663; H01M 4/667; H01M 4/668; H01G 11/28; H01G 11/36; H01G 11/38; H01G 11/46; H01G 11/68; H01G 11/70; H01G 11/86; Y02E 60/13
See application file for complete search history.

(56) References Cited

U.S. PATENT DOCUMENTS

| | | | |
|---|---|---|---|
| 2012/0313591 A1 | 12/2012 | Brambilla et al. | |
| 2015/0086860 A1* | 3/2015 | Yokoi | H01M 4/133 |
| | | | 429/188 |
| 2015/0213967 A1 | 7/2015 | Yokouchi et al. | |
| 2016/0200850 A1 | 7/2016 | Hatanaka et al. | |

FOREIGN PATENT DOCUMENTS

| | | |
|---|---|---|
| JP | 2013-045984 A | 3/2013 |
| JP | 2014-116317 A | 6/2014 |
| WO | WO 2008/114667 A1 | 9/2008 |
| WO | WO 2015/029949 A1 | 3/2015 |

OTHER PUBLICATIONS

Armstrong, G., et. al. "TiO2(B) Nanowires as an Improved Anode Material for Lithium-Ion Batteries Containing LiFePO4 or LiNi0.5Mn1.5O4 Cathodes and a Polymer Electrolyte", 18, pp. 2597-2600, published Sep. 26, 2006. (Year: 2006).*
European Search Report dated Dec. 3, 2018, in European Patent Application No. 16883786.2.
International Search Report for PCT/JP2016/088013 (PCT/ISA/210) dated Jan. 31, 2017.
Written Opinion of the International Searching Authority for PCT/JP2016/088013 (PCT/ISA/237) dated Jan. 31, 2017.

* cited by examiner

ELECTRODE FOR ENERGY STORAGE DEVICES

TECHNICAL FIELD

The present invention relates to an electrode for an energy storage device.

BACKGROUND ART

With the need for smaller sizes, lower weights and higher functionality in portable electronic devices such as smart phones, digital cameras and handheld game consoles, the development of high-performance batteries has been actively promoted in recent years, and demand for secondary batteries—which can be repeatedly used by charging—is growing rapidly. Lithium-ion secondary batteries in particular, because of their high energy density and high voltage, and moreover because they have no memory effect during charging and discharging, are the secondary batteries currently being most vigorously developed. Electrical car development is also proceeding apace as part of recent efforts to tackle environment problems, and an even higher level of performance is being demanded of the secondary batteries that serve as the power source in such vehicles.

Lithium-ion secondary cells have a structure in which a container houses a positive electrode and a negative electrode capable of intercalating and deintercalating lithium and a separator interposed between the electrodes, and is filled with an electrolyte solution (in the case of lithium-ion polymer secondary cells, a gel-like or completely solid electrolyte instead of a liquid electrolyte solution).

The positive electrode and negative electrode are generally produced by forming a composition which includes an active material capable of intercalating and deintercalating lithium, an electrically conductive material composed primarily of a carbon material, and a binder resin into a layer on a current collector such as copper foil or aluminum foil.

Carbon materials are widely used as negative electrode active materials. Recently, given the desire for further improvement in battery safety, active research and development has been carried out on negative electrode active materials having a high electric potential. For example, it is reported that titanium-containing oxides such as titanium oxide and lithium titanate are useful as such negative electrode active materials (Patent Documents 1 and 2).

However, because titanium-containing oxides have a low electrical conductivity compared with negative electrode active materials that use a carbon material such as graphite, in secondary batteries having a negative electrode active material layer that includes a titanium-containing oxide, the contact resistance between the negative electrode active materials and the contact resistance at the interface between the negative electrode active material and the current collector are high. As a result, the internal resistance and impedance of the secondary battery rise, making rapid charging and discharging at a large current impossible. Hence, in cases where a titanium-containing oxide is used as the negative electrode active material, measures taken to increase the conductivity of the negative electrode active material layer include adding a large amount of a conductive additive to the negative electrode active material layer, or coating a conductive material onto the surface of the negative electrode active material. A drawback in such cases is that the volume-based or weight-based capacity of the negative electrode active material layer declines in the degree to which material that does not contribute to the electrical capacity is added to the negative electrode active material layer.

Patent Document 3 describes art for producing secondary batteries in which, by placing an undercoat layer between a negative electrode active material layer and a current-collecting substrate and thereby lowering the resistance at the contact interface between the negative electrode active material layer and the current-collecting substrate, even in cases where a titanium-containing oxide is used in the negative electrode active material, a large amount of conductive additive is not added to the negative electrode active material layer, the internal resistance and impedance of the secondary cell are small, and the cell can be rapidly charged and discharged at a large current. Yet, in Patent Document 3, acetylene black is used as the conductive material in the undercoat layer, and the coating weight of the undercoat layer cannot be made sufficiently small. When one thinks of the undercoat layer as part of the electrode, this has the unfortunate result of reducing the electrode capacity.

PRIOR ART DOCUMENTS

Patent Documents

Patent Document 1: JP-A 2001-143702
Patent Document 2: WO 2008/114667
Patent Document 3: JP-A 2013-033685

SUMMARY OF INVENTION

Technical Problem

The present invention was arrived at in light of the above circumstances. An object of the invention is to provide an electrode for an energy storage device which, even in cases where a titanium-containing oxide is used in the active material, is capable of being rapidly charged and discharged at a large current without greatly diminishing the electrode capacity.

Solution to Problem

The inventors have conducted extensive investigations aimed at lowering the resistance of an electrode in which a titanium-containing oxide is used in the active material without greatly reducing the electrode capacity. As a result, they have discovered that by having the carbon material included in an undercoat layer formed on at least one side of a current-collecting substrate be carbon nanotubes (CNTs), even in cases where the coating weight of the undercoat layer is small, the resistance of an electrode that uses a titanium-containing oxide in the active material can be reduced.

Accordingly, the invention provides the following electrode for an energy storage device.

1. An energy storage device electrode which includes a current-collecting substrate, a CNT-containing undercoat layer formed on at least one side of the current-collecting substrate, and an active material layer that includes a titanium-containing oxide-containing active material and is formed on a surface of the undercoat layer.
2. The energy storage device electrode of 1 above, wherein the undercoat layer includes a CNT dispersant made of a pendant oxazoline group-containing polymer.

3. The energy storage device electrode of 2 above, wherein the polymer is obtained by radical polymerization of an oxazoline monomer of formula (1) below

[Chem. 1]

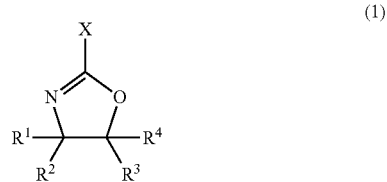
(1)

wherein X is a polymerizable carbon-carbon double bond-containing group, $R^1$ to $R^4$ are each independently a hydrogen atom, a halogen atom, a linear, branched or cyclic alkyl group of 1 to 5 carbon atoms, an aryl group of 6 to 20 carbon atoms or an aralkyl group of 7 to 20 carbon atoms.

4. The energy storage device electrode of any of 1 to 3 above, wherein the titanium-containing oxide is titanium oxide.

5. The energy storage device electrode of 4 above, wherein the titanium oxide is titanium oxide having a bronze-type crystal structure.

6. The energy storage device electrode of any of 1 to 5 above, wherein the active material layer includes a styrene-butadiene rubber as a binder and a carboxymethylcellulose salt as a thickener.

7. The energy storage device electrode of any of 1 to 6 above, wherein the undercoat layer has a coating weight per side of the current-collecting substrate of not more than 0.1 g/m².

8. An energy storage device comprising the energy storage device electrode of any of 1 to 7 above.

9. The energy storage device of 8 above, wherein the energy storage device electrode is a negative electrode.

10. The energy storage device of 8 or 9 above which is a lithium-ion secondary battery.

11. A method for producing the energy storage device electrode of 1 above, which method includes the step of applying an electrode slurry prepared by mixing together a titanium-containing oxide, a binder and an optional thickener using water as a dispersant onto the surface of a CNT-containing undercoat layer formed on at least one side of a current-collecting substrate; and drying the applied slurry.

Advantageous Effects of Invention

This invention has the advantageous effect of making it possible to provide an energy storage device electrode which, even in cases where a titanium-containing oxide is used in the active material, is capable of being rapidly charged and discharged at a large current without greatly diminishing the electrode capacity.

BRIEF DESCRIPTION OF THE DIAGRAMS

DESCRIPTION OF EMBODIMENTS

[Energy Storage Device Electrode]

Figure 1:
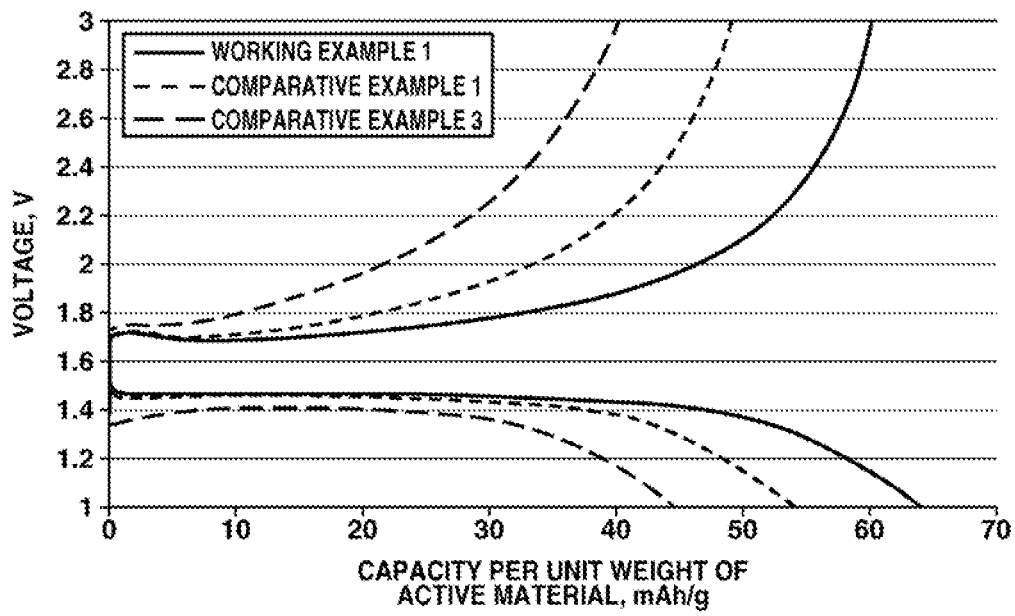
FIG. 1 shows the charge-discharge curves at 0.5 C in Working Example 1 and Comparative Examples 1 and 3.

The energy storage device electrode of the invention includes a current-collecting substrate, a CNT-containing undercoat layer formed on at least one side of the current-collecting substrate, and an active material layer that includes a titanium-containing oxide-containing active material and is formed on a surface of the undercoat layer.

The energy storage device in this invention is exemplified by various types of energy storage devices, including lithium secondary batteries, lithium-ion secondary batteries, proton polymer batteries, nickel-hydrogen batteries, electrical double-layer capacitors, aluminum solid capacitors, electrolytic capacitors and lead storage batteries. The electrode of the invention is particularly well-suited for use in lithium-ion secondary batteries and electrical double-layer capacitors.

[Current-Collecting Substrate]

The current-collecting substrate may be suitably selected from among materials which have hitherto been used as current-collecting substrates in energy storage device electrodes. For example, use can be made of thin films of any of the following: aluminum, copper, nickel, gold, silver, and alloys thereof, as well as carbon materials, metal oxides, and conductive polymers. Of these, from the standpoint of electrical conductivity, weight and cost, the use of a metal foil made of aluminum or an aluminum alloy is preferred. The thickness of the current-collecting substrate is not particularly limited, although a thickness of from 1 to 100 μm is preferred in this invention.

[Undercoat Layer]

The undercoat layer includes CNTs, and also optionally includes a CNT dispersant and/or a matrix polymer. The undercoat layer is preferably produced using a CNT-containing composition (dispersion) which includes CNTs, a solvent and, optionally, a CNT dispersant and/or a matrix polymer.

Carbon nanotubes are generally produced by an arc discharge process, chemical vapor deposition (CVD), laser ablation or the like. The CNTs used in this invention may be obtained by any of these methods. CNTs are categorized as single-walled CNTs consisting of a single cylindrically rolled graphene sheet (abbreviated below as "SWCNTs"), double-walled CNTs consisting of two concentrically rolled graphene sheets (abbreviated below as "DWCNTs"), and multi-walled CNTs consisting of a plurality of concentrically rolled graphene sheets (MWCNTs). Any of these may be used in the invention. One of these types of CNT may be used alone, or two or more types may be used in combination.

When SWCNTs, DWCNTs or MWCNTs are produced by the above methods, catalyst metals such as nickel, iron, cobalt or yttrium may remain in the product, and so purification to remove these impurities is sometimes necessary. Acid treatment with nitric acid, sulfuric acid or the like together with ultrasonic treatment is effective for the removal of impurities. However, in acid treatment with nitric acid, sulfuric acid or the like, there is a possibility of the π-conjugated system making up the CNTs being destroyed and the properties inherent to the CNTs being lost. It is thus desirable for the CNTs to be purified and used under suitable conditions.

The average fiber diameter of the CNT, although not particularly limited, is preferably from 1 to 100 nm, and more preferably from 1 to 50 nm.

Specific examples of CNTs that may be used in the invention include CNTs synthesized by the super growth method (available from the New Energy and Industrial Technology Development Organization (NEDO) in the National Research and Development Agency), eDIPS-CNTs (available from NEDO in the National Research and Development Agency), the SWNT series (available under this trade name from Meijo Nano Carbon), the VGCF series (available under this trade name from Showa Denko KK), the FloTube series (available under this trade name from CNano Technology), AMC (available under this trade name from Ube Industries, Ltd.), the NANOCYL NC7000 series (available under this trade name from Nanocyl S.A.), Baytubes (available under this trade name from Bayer), GRAPHISTRENGTH (available under this trade name from Arkema), MWNT7 (available under this trade name from Hodogaya Chemical Co., Ltd.) and Hyperion CNT (available from Hyperion Catalysis International).

The solvent is not particularly limited, provided it is one that has hitherto been used in the preparation of CNT-containing compositions. Illustrative examples include water, and the following organic solvents: alcohols such as methanol, ethanol, 1-propanol and 2-propanol; ethers such as tetrahydrofuran (THF), diethyl ether and 1,2-dimethoxyethane (DME); halogenated hydrocarbons such as methylene chloride, chloroform and 1,2-dichloroethane: amides such as N,N-dimethylformamide (DMF), N,N-dimethylacetamide (DMAc) and N-methyl-2-pyrrolidone (NMP); ketones such as acetone, methyl ethyl ketone, methyl isobutyl ketone and cyclohexanone; aliphatic hydrocarbons such as n-heptane, n-hexane and cyclohexane; aromatic hydrocarbons such as benzene, toluene, xylene and ethylbenzene; glycol ethers such as ethylene glycol monoethyl ether, ethylene glycol monobutyl ether and propylene glycol monomethyl ether; and glycols such as ethylene glycol and propylene glycol. Of these, in terms of being able to increase the proportion of individually dispersed CNTs, water, NMP, DMF, THF, methanol and isopropanol are preferred. These solvents may be of one type used alone or of two or more types used in admixture.

The CNT dispersant is preferably made of a pendant oxazoline group-containing polymer. The polymer is not particularly limited, although one obtained by radical polymerizing an oxazoline monomer having a polymerizable carbon-carbon double bond-containing group at the 2 position is preferred. Such oxazoline monomers are exemplified by compounds of formula (1) below.

[Chem. 2]

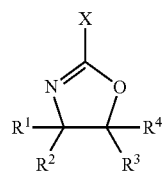

(1)

In the formula, X is a polymerizable carbon-carbon double bond-containing group, and $R^1$ to $R^4$ are each independently a hydrogen atom, a halogen atom, a linear, branched or cyclic alkyl group of 1 to 5 carbon atoms, an aryl group of 6 to 20 carbon atoms or an aralkyl group of 7 to 20 carbon atoms.

The polymerizable carbon-carbon double bond-containing group is not particularly limited so long as it includes a polymerizable carbon-carbon double bond. However, an acyclic hydrocarbon group which includes a polymerizable carbon-carbon double bond is preferred. For example, alkenyl groups of 2 to 8 carbon atoms, such as vinyl, allyl and isopropenyl groups are preferred.

Examples of the halogen atom include fluorine, chlorine, bromine and iodine atoms. Examples of the alkyl group include methyl, ethyl, n-propyl, isopropyl, n-butyl, s-butyl, t-butyl and n-pentyl groups. Examples of the aryl group include phenyl, xylyl, tolyl, biphenyl and naphthyl groups. Examples of the aralkyl group include benzyl, phenylethyl and phenylcyclohexyl groups.

Illustrative examples of the oxazoline monomer of formula (1) include 2-vinyl-2-oxazoline, 2-vinyl-4-methyl-2-oxazoline, 2-vinyl-4-ethyl-2-oxazoline, 2-vinyl-4-propyl-2-oxazoline, 2-vinyl-4-butyl-2-oxazoline, 2-vinyl-5-methyl-2-oxazoline, 2-vinyl-5-ethyl-2-oxazoline, 2-vinyl-5-propyl-2-oxazoline, 2-vinyl-5-butyl-2-oxazoline, 2-isopropenyl-2-oxazoline, 2-isopropenyl-4-methyl-2-oxazoline, 2-isopropenyl-4-ethyl-2-oxazoline, 2-isopropenyl-4-propyl-2-oxazoline, 2-isopropenyl-4-butyl-2-oxazoline, 2-isopropenyl-5-methyl-2-oxazoline, 2-isopropenyl-5-ethyl-2-oxazoline, 2-isopropenyl-5-propyl-2-oxazoline and 2-isopropenyl-5-butyl-2-oxazoline. Of these, in terms of availability and the like, preferred examples include 2-isopropenyl-2-oxazoline.

The undercoat layer is preferably formed using a CNT-containing composition which includes an aqueous solvent. Hence, the oxazoline polymer is preferably water-soluble. Such a water-soluble oxazoline polymer may be a homopolymer of an oxazoline monomer of formula (1) or, to further increase the solubility in water, it may be a polymer obtained by the radical polymerization of at least two types of monomer: the above oxazoline monomer and a hydrophilic functional group-containing (meth)acrylic ester monomer.

Specific examples of hydrophilic functional group-containing (meth)acrylic monomers include (meth)acrylic acid, 2-hydroxyethyl (meth)acrylate, methoxy polyethylene glycol (meth)acrylate, a monoesterified product of (meth)acrylic acid and polyethylene glycol, 2-aminoethyl (meth)acrylate and salts thereof, sodium (meth)acrylate, ammonium (meth)acrylate, (meth)acrylonitrile, (meth)acrylamide, N-methylol (meth)acrylamide, N-(2-hydroxyethyl) (meth)acrylamide and sodium styrenesulfonate. These may be used singly, or two or more may be used in combination. Of these, methoxy polyethylene glycol (meth)acrylate and a monoesterified product of (meth)acrylic acid and polyethylene glycol are preferred.

Concomitant use may be made of monomers other than the oxazoline monomer and the hydrophilic functional group-containing (meth)acrylic monomer, provided that doing so does not adversely affect the ability of the oxazoline polymer to disperse CNTs. Illustrative examples of such other monomers include (meth)acrylic ester monomers such as methyl (meth)acrylate, ethyl (meth)acrylate, butyl (meth)acrylate, 2-ethylhexyl (meth)acrylate, stearyl (meth)acrylate, perfluoroethyl (meth)acrylate and phenyl (meth)acrylate; α-olefin monomers such as ethylene, propylene, butene and pentene; haloolefin monomers such as vinyl chloride, vinylidene chloride and vinyl fluoride; styrene monomers such as styrene and α-methylstyrene; vinyl carboxylate monomers such as vinyl acetate and vinyl propionate; and vinyl ether monomers such as methyl vinyl ether and ethyl vinyl ether. These may each be used singly, or two or more may be used in combination.

In terms of further increasing the CNT dispersing ability of the resulting oxazoline polymer, the content of oxazoline monomer in the monomer ingredients used to prepare the oxazoline polymer employed in the invention is preferably at least 10 wt %, more preferably at least 20 wt %, and even more preferably at least 30 wt %. The upper limit in the content of the oxazoline monomer in the monomer ingredients is 100 wt %, in which case a homopolymer of the oxazoline monomer is obtained.

To further increase the water solubility of the resulting oxazoline polymer, the content of hydrophilic functional group-containing (meth)acrylic monomer in the monomer ingredients is preferably at least 10 wt %, more preferably at least 20 wt %, and even more preferably at least 30 wt %, but is preferably not more than 90 wt %, more preferably not more than 80 wt %, and even more preferably not more than 70 wt %.

The content of other monomers in the monomer ingredients is in a range that does not affect the ability of the resulting oxazoline polymer to disperse CNTs. This content differs according to the type of monomer and thus cannot be strictly specified, but may be suitably set in the range of from 5 to 95 wt %, and preferably from 10 to 90 wt %.

The weight-average molecular weight (Mw) of the oxazoline polymer is not particularly limited, but is preferably from 1,000 to 2,000,000, and more preferably from 2,000 to 1,000,000. In this invention, the Mw is a polystyrene-equivalent measured value obtained by gel permeation chromatography.

The oxazoline polymer that can be used in this invention may be synthesized by a known radical polymerization of the above monomers or may be acquired as a commercial product. Illustrative examples of such commercial products include Epocros® WS-300 (available from Nippon Shokubai Co., Ltd.; solids concentration, 10 wt %; aqueous solution), Epocros® WS-700 (Nippon Shokubai Co., Ltd.; solids concentration, 25 wt %; aqueous solution), Epocros® WS-500 (Nippon Shokubai Co., Ltd.; solids concentration, 39 wt %; water/1-methoxy-2-propanol solution), Poly(2-ethyl-2-oxazoline) (Aldrich), Poly(2-ethyl-2-oxazoline) (Alfa Aesar), and Poly(2-ethyl-2-oxazoline) (VWR International, LLC). When the oxazoline polymer is commercially available as a solution, the solution may be used directly as is or may be used after replacing the solvent with a target solvent.

The mixing ratio of the CNTs and the dispersant in the CNT-containing composition used in the invention, expressed as a weight ratio, may be set to from about 1,000:1 to about 1:100. The concentration of dispersant in the CNT-containing composition is not particularly limited, provided it is a concentration that allows the CNTs to disperse in the solvent. However, the concentration in the composition is set to preferably from about 0.001 to about 30 wt %, and more preferably from about 0.002 to about 20 wt %. The concentration of CNTs in the CNT-containing composition varies according to the coating weight of the target undercoat layer and the required mechanical, electrical and thermal characteristics, and may be any concentration at which at least some portion of the CNTs individually disperse and the undercoat layer can be produced. The concentration of CNTs in the composition is preferably from about 0.0001 to about 30 wt %, more preferably from about 0.001 to about 20 wt %, and even more preferably from about 0.001 to about 10 wt %.

Illustrative examples of the matrix polymer include the following thermoplastic resins: fluoropolymers such as polyvinylidene fluoride (PVDF), polytetrafluoroethylene (PTFE), tetrafluoroethylene-hexafluoropropylene copolymers (P(TFE-HFP)), vinylidene fluoride-hexafluoropropylene copolymers (P(VDF-HFP)) and vinylidene fluoride-chlorotrifluoroethylene copolymers (P(VDF-CTFE)), polyolefin resins such as polyvinylpyrrolidone (PVP), ethylene-propylene-diene terpolymers (EPDM), polyethylene (PE), polypropylene (PP), ethylene-vinyl acetate copolymers (EVA) and ethylene-ethyl acrylate copolymers (EEA), polystyrene resins such as polystyrene (PS), high-impact polystyrene (HIPS), acrylonitrile-styrene copolymers (AS), acrylonitrile-butadiene-styrene copolymers (ABS), methyl methacrylate-styrene copolymers (MS) and styrene-butadiene rubbers (SBR), polycarbonate resins, vinyl chloride resins, polyamide resins, polyimide resins, (meth)acrylic resins such as sodium polyacrylate and polymethyl methacrylate (PMMA), polyester resins such as polyethylene terephthalate (PET), polybutylene terephthalate, polyethylene naphthalate, polybutylene naphthalate, polylactic acid (PLA), poly-3-hydroxybutyric acid, polycaprolactone, polybutylene succinate and polyethylene succinate/adipate, polyphenylene ether resins, modified polyphenylene ether resins, polyacetal resins, polysulfone resins, polyphenylene sulfide resins, polyvinyl alcohol (PVA) resins, polyglycolic acids, modified starches, cellulose acetate, carboxymethylcellulose (CMC) and cellulose triacetate, and chitin, chitosan and lignin; the following electrically conductive polymers: polyaniline and emeraldine base (the semi-oxidized form of polyaniline), polythiophene, polypyrrole, polyphenylene vinylene, polyphenylene and polyacetylene; and the following thermoset or photocurable resins: epoxy resins, urethane acrylate, phenolic resins, melamine resins, urea resins and alkyd resins. Because it is desirable to use water as the solvent in the CNT-containing composition of the invention, the matrix polymer is preferably a water-soluble polymer such as sodium polyacrylate, carboxymethylcellulose sodium, water-soluble cellulose ether, sodium alginate, polyvinyl alcohol, polystyrene sulfonic acid or polyethylene glycol. Sodium polyacrylate and carboxymethylcellulose sodium are especially preferred.

The matrix polymer may be acquired as a commercial product. Illustrative examples of such commercial products include sodium polyacrylate (Wako Pure Chemical Industries Co., Ltd.; degree of polymerization, 2,700 to 7,500), carboxymethylcellulose sodium (Wako Pure Chemical Industries, Ltd.), sodium alginate (Kanto Chemical Co., Ltd.; extra pure reagent), the Metolose® SH Series (hydroxypropylmethyl cellulose, from Shin-Etsu Chemical Co., Ltd.), the Metolose® SE Series (hydroxyethylmethyl cellulose, from Shin-Etsu Chemical Co., Ltd.), JC-25 (a fully saponified polyvinyl alcohol, from Japan Vam & Poval Co., Ltd.), JM-17 (an intermediately saponified polyvinyl alcohol, from Japan Vam & Poval Co., Ltd.), JP-03 (a partially saponified polyvinyl alcohol, from Japan Vam & Poval Co., Ltd.) and polystyrenesulfonic acid (from Aldrich Co.; solids concentration, 18 wt %; aqueous solution).

The matrix polymer content, although not particularly limited, is preferably set to from about 0.0001 to about 99 wt %, and more preferably from about 0.001 to about 90 wt %, of the composition.

The CNT-containing composition used in the invention may include a crosslinking agent that gives rise to a crosslinking reaction with the dispersant used, or a crosslinking agent that is self-crosslinking. These crosslinking agents preferably dissolve in the solvent that is used. The oxazoline polymer crosslinking agent is not particularly limited, provided it is a compound having two or more functional groups that react with oxazoline groups, such as carboxyl, hydroxyl, thiol, amino, sulfinic acid and epoxy groups. A compound having two or more carboxyl groups is preferred. Compounds which contain functional groups, such as the sodium, potassium, lithium and ammonium salts of carboxylic acids, that, under heating during thin-film formation or in the presence of an acid catalyst, generate the above functional groups and give rise to crosslinking reactions, may also be used as the crosslinking agent.

Examples of compounds which give rise to crosslinking reactions with oxazoline groups include the metal salts of synthetic polymers such as polyacrylic acid and copolymers thereof or of natural polymers such as CMC or alginic acid which give rise to crosslink reactivity in the presence of an acid catalyst, and ammonium salts of these same synthetic polymers and natural polymers which give rise to crosslink reactivity under heating. Sodium polyacrylate, lithium polyacrylate, ammonium polyacrylate, carboxymethylcellulose sodium, carboxymethylcellulose lithium and carboxymethylcellulose ammonium, which give rise to crosslink reactivity in the presence of an acid catalyst or under heating conditions, are especially preferred.

These compounds that give rise to crosslinking reactions with oxazoline groups may be acquired as commercial products. Examples of such commercial products include sodium polyacrylate (Wako Pure Chemical Industries Co., Ltd.; degree of polymerization, 2,700 to 7,500), carboxymethylcellulose sodium (Wako Pure Chemical Industries, Ltd.), sodium alginate (Kanto Chemical Co., Ltd.; extra pure reagent), Aron® A-30 (ammonium polyacrylate, from Toagosei Co., Ltd.; solids concentration, 32 wt %; aqueous solution), DN-800H (carboxymethylcellulose ammonium, from Daicel FineChem, Ltd.), and ammonium alginate (Kimica Corporation).

Examples of crosslinking agents that are self-crosslinking include compounds having, on the same molecule, crosslinkable functional groups which react with one another, such as a hydroxyl group with an aldehyde group, epoxy group, vinyl group, isocyanate group or alkoxy group; a carboxyl group with an aldehyde group, amino group, isocyanate group or epoxy group; or an amino group with an isocyanate group or aldehyde group; and compounds having like crosslinkable functional groups which react with one another, such as hydroxyl groups (dehydration condensation), mercapto groups (disulfide bonding), ester groups (Claisen condensation), silanol groups (dehydrative condensation), vinyl groups and acrylic groups.

Specific examples of crosslinking agents that are self-crosslinking include any of the following which exhibit crosslink reactivity in the presence of an acid catalyst: polyfunctional acrylates, tetraalkoxysilanes, and block copolymers of a blocked isocyanate group-containing monomer and a monomer having at least one hydroxyl, carboxyl or amino group.

Such crosslinking agents that are self-crosslinking may be acquired as commercial products. Examples of commercial products include polyfunctional acrylates such as A-9300 (ethoxylated isocyanuric acid triacrylate, from Shin-Nakamura Chemical Co., Ltd.), A-GLY-9E (Ethoxylated glycerine triacrylate (ethylene oxide, 9 moles), from Shin-Nakamura Chemical Co., Ltd.) and A-TMMT (pentaerythritol tetraacrylate, from Shin-Nakamura Chemical Co., Ltd.); tetraalkoxysilanes such as tetramethoxysilane (Tokyo Chemical Industry Co., Ltd.) and tetraethoxysilane (Toyoko Kagaku Co., Ltd.); and blocked isocyanate group-containing polymers such as the Elastron® Series E-37, H-3, H38, BAP, NEW BAP-15, C-52, F-29, W-11P, MF-9 and MF-25K (DKS Co., Ltd.).

The amount in which these crosslinking agents is added varies according to, for example, the solvent to be used, the substrate to be used, the required viscosity and the required film shape, but is generally from 0.001 to 80 wt %, preferably from 0.01 to 50 wt %, and more preferably from 0.05 to 40 wt %, based on the dispersant. These crosslinking agents, although they sometimes give rise to crosslinking reactions due to self-condensation, induce crosslinking reactions with the dispersant. In cases where crosslinkable substituents are present in the dispersant, crosslinking reactions are promoted by these crosslinkable substituents.

The following may be added to the CNT-containing composition as catalysts for accelerating the crosslinking reaction: acidic compounds such as p-toluenesulfonic acid, trifluoromethanesulfonic acid, pyridinium p-toluenesulfonic acid, salicylic acid, sulfosalicylic acid, citric acid, benzoic acid, hydroxybenzoic acid and naphthalenecarboxylic acid, and/or thermal acid generators such as 2,4,4,6-tetrabromocyclohexadienone, benzoin tosylate, 2-nitrobenzyl tosylate and alkyl esters of organic sulfonic acids. The amount of catalyst added with respect to the CNT dispersant is preferably from 0.0001 to 20 wt %, more preferably from 0.0005 to 10 wt %, and even more preferably from 0.001 to 3 wt %.

The method of preparing the CNT-containing composition is not particularly limited. A dispersion may be prepared by the mixture of, in any order: the CNTs, the solvent, and also the optionally used dispersant, matrix polymer and crosslinking agent. The mixture at this time is preferably dispersion treated. Such treatment enables the proportion of the CNTs that are dispersed to be further increased. Examples of dispersion treatment include mechanical treatment in the form of wet treatment using, for instance, a ball mill, bead mill or jet mill, or in the form of ultrasonic treatment using a bath-type or probe-type sonicator. Wet treatment using a jet mill and ultrasonic treatment are especially preferred. The dispersion treatment may be carried out for any length of time, although a treatment time of from about 1 minute to about 10 hours is preferred, and a period of from about 5 minutes to about 5 hours is even more preferred. If necessary, heat treatment may be carried out at this time. When a crosslinking agent and/or a matrix polymer are used, these may be added following preparation of a mixture composed of the dispersant, the CNTs and the solvent.

The undercoat layer may be formed by applying the above CNT-containing composition to at least one side of a current-collecting substrate and then drying the applied composition in air or under heating. The undercoat layer may be formed on part of the current-collecting substrate surface or may be formed over the entire surface.

In this invention, the coating weight of the undercoat layer per side of the current-collecting substrate can generally be set to 1.5 $g/m^2$ or less; the advantageous effects of the invention are attainable even at a low coating weight. Accordingly, the coating weight may be set to preferably 0.1 $g/m^2$ or less, more preferably 0.09 $g/m^2$ or less, and even more preferably less than 0.05 $g/m^2$. On the other hand, to ensure that the undercoat layer functions and to reproducibly obtain batteries having excellent characteristics, the coating weight of the undercoat layer per side of the current-collecting substrate is preferably at least 0.001 $g/m^2$, more preferably at least 0.005 $g/m^2$, and even more preferably at least 0.01 $g/m^2$.

The thickness of the undercoat layer is not particularly limited, so long as the above coating weight is satisfied. However, to suppress a decline in the capacity of the resulting device owing to use of the undercoat layer, the thickness is preferably from 0.01 to 10 μm.

The coating weight of the undercoat layer in this invention is the ratio of the undercoat layer weight (g) to the undercoat layer surface area (m$^2$). When the undercoat layer has been formed in a pattern, this surface area is the surface area of the undercoat layer alone and does not include the surface area of the current-collecting substrate that lies exposed between areas of the patterned undercoat layer.

The weight of the undercoat layer can be determined by, for example, cutting out a test specimen of a suitable size from the undercoat foil and measuring its weight $W_0$, subsequently peeling the undercoat layer from the undercoat foil and measuring the weight $W_1$ after the undercoat layer has been removed, and calculating the difference therebetween ($W_0-W_1$). Alternatively, the weight of the undercoat layer can be determined by first measuring the weight $W_2$ of the current-collecting substrate, subsequently measuring the weight $W_3$ of the undercoat foil after forming the undercoat layer, and calculating the difference therebetween ($W_3-W_2$). The method used to peel off the undercoat layer may involve, for example, immersing the undercoat layer in a solvent which dissolves the undercoat layer or causes it to swell, and then wiping off the undercoat layer with a cloth or the like.

The coating weight may be adjusted by a known method. For example, in cases where the undercoat layer is formed by coating, the coating weight can be adjusted by varying the solids concentration of the undercoat layer-forming coating fluid (CNT-containing composition), the number of coating passes or the clearance of the coating fluid delivery opening in the coater. When one wishes to raise the coating weight, this is done by making the solids concentration higher, increasing the number of coating passes or making the clearance larger. When one wishes to lower the coating weight, this is done by making the solids concentration lower, reducing the number of coating passes or making the clearance smaller.

Examples of methods for applying the CNT-containing composition include spin coating, dip coating, flow coating, inkjet coating, spray coating, bar coating, gravure coating, slit coating, roll coating, flexographic printing, transfer printing, brush coating, blade coating and air knife coating. From the standpoint of work efficiency and other considerations, inkjet coating, casting, dip coating, bar coating, blade coating, roll coating, gravure coating, flexographic printing and spray coating are preferred.

The temperature during drying under applied heat, although not particularly limited, is preferably from about 50° C. to about 200° C., and more preferably from about 80° C. to about 180° C.

[Active Material Layer]

The energy storage device electrode of the invention has an active material layer on the surface of the above undercoat layer. The active material layer can be formed by applying an electrode slurry containing an active material, a binder polymer and, optionally, a thickener or a solvent onto the undercoat layer, then drying the applied slurry in air or under heating. The region where the active material layer is formed should be suitably selected according to, for example, the cell configuration of the device to be used, and may be the entire surface of the undercoat layer or some part of that surface. However, when an electrode assembly having metal tabs and electrodes joined together by welding (e.g., ultrasonic welding) is to be used in, for example, a laminate cell, in order to leave a welding region, it is preferable to form the active material layer by applying the electrode slurry onto part of the undercoat layer surface. In laminate cell applications, it is especially preferable to form the active material layer by applying the electrode slurry onto all regions of the undercoat layer other than the peripheral edge thereof.

The active material includes a titanium-containing oxide. Examples of titanium-containing oxides include titanium oxide and lithium titanate. Of these, in terms of capacity, life, voltage and the like, titanium oxide is preferred. Titanium oxide having a bronze-type crystal structure ($TiO_2(B)$) is especially preferred.

A known material may be suitably selected and used as the binder polymer. Illustrative examples include electrically conductive polymers such as PVDF, PVP, PTFE, P(TFE-HFP), P(VDF-HFP), P(VDF-CTFE), PVA, polyimides, EPDM, SBR, CMC, polyacrylic acid (PAA) and polyaniline. The amount of binder polymer added per 100 parts by weight of the active material is preferably from 0.1 to 20 parts by weight, and more preferably from 1 to 10 parts by weight.

In cases where the electrode slurry has a low viscosity and application is difficult, a thickener may be optionally used. The thickener may be suitably selected and used from among known materials, examples of which include the sodium and ammonium salts of CMC. These are available as commercial products. Specific examples include the same as the above-mentioned compounds which induce crosslinking reactions with oxazoline groups. The amount of thickener added may be suitably selected so as to give an electrode slurry suitable for application, with the amount being preferably from 0.1 to 20 parts by weight, and more preferably from 0.5 to 10 parts by weight, per 100 parts by weight of the active material.

The solvent is exemplified by the solvents mentioned above for the CNT-containing composition. The solvent may be suitably selected from among these according to the type of binder, although NMP is preferred in the case of water-insoluble binders such as PVDF, and water is preferred in the case of water-soluble or water-dispersible binders such as SBR.

The electrode slurry may or may not include a conductive additive. Illustrative examples of conductive additives include carbon black, ketjen black, acetylene black, carbon whiskers, carbon fibers, CNTs, natural graphite, synthetic graphite, ruthenium oxide, aluminum and nickel. The amount of conductive additive included is preferably not more than 10 parts by weight, and more preferably not more than 5 parts by weight.

The method of applying the electrode slurry is exemplified by the same techniques as mentioned above for the CNT-containing composition. The temperature when drying under applied heat, although not particularly limited, is preferably from about 50° C. to about 400° C., and more preferably from about 80° C. to about 150° C.

The thickness of the active material layer, taking into account the balance between the cell capacity and resistance, is preferably from 10 to 500 μm, more preferably from 10 to 300 μm, and even more preferably from 20 to 100 μm.

If necessary, the energy storage device electrode of the invention may be pressed. Any commonly used method may be employed for pressing, although a mold pressing or roll pressing method is especially preferred. The pressing force in roll pressing, although not particularly limited, is preferably from 0.2 to 3 ton/cm.

[Energy Storage Device]

The energy storage device of the invention is equipped with the above-described energy storage device electrode. More specifically, it is constructed of at least a pair of positive and negative electrodes, a separator between these electrodes, and an electrolyte. The energy storage device electrode of the invention is used as either the positive electrode or the negative electrode. Constituent members of the device other than the foregoing energy storage device electrode, such as the other electrode, the separator and the electrolyte, may be suitably selected from known materials.

The energy storage device electrode of the invention may be used as the negative electrode or the positive electrode of an energy storage device, although in terms of the voltage and the energy density of the energy storage device obtained, use as the negative electrode is preferred.

In cases where the energy storage device electrode of the invention is used as the negative electrode, the positive electrode may be one that is commonly used in energy storage devices, such as one that has a current-collecting substrate and has a positive electrode active material layer formed on top thereof. The current-collecting substrate is exemplified in the same way as described above.

The positive electrode active material layer may be formed by applying an electrode slurry containing a positive electrode active material, a binder polymer and, optionally, a solvent and a conductive additive, onto a current-collecting substrate, and drying the applied slurry in air or under heating. The binder polymer, solvent and conductive additive here are exemplified in the same way as above.

The positive electrode active material used in the positive electrode is exemplified by chalcogen compounds capable of intercalating and deintercalating lithium ions, lithium ion-containing chalcogen compounds, polyanion compounds, elemental sulfur and sulfur compounds. Illustrative examples of such chalcogen compounds include $FeS_2$, $TiS_2$, $MoS_2$, $V_2O_6$, $V_6O_{13}$ and $MnO_2$. Illustrative examples of lithium ion-containing chalcogen compounds include $LiCoO_2$, $LiMnO_2$, $LiMn_2O_4$, $LiMo_2O_4$, $LiV_3O_4$, $LiNiO_2$ and $Li_xNi_yM_{1-y}O_2$ (wherein M is one or more metal element selected from cobalt, manganese, titanium, chromium, vanadium, aluminum, tin, lead and zinc, $0.05 \leq x \leq 1.10$, and $0.5 \leq y \leq 1.0$). An example of a polyanion compound is $LiFePO_4$. Illustrative examples of sulfur compounds include $Li_2S$ and rubeanic acid.

In cases where the energy storage device electrode of the invention is used as the positive electrode, the negative electrode may be one that is commonly used in energy storage devices, such as one that has a current-collecting substrate and has a negative electrode active material layer formed on top thereof. The current-collecting substrate is exemplified in the same way as above. Examples of negative electrode active materials include metallic lithium, lithium alloys, at least one elemental substance selected from among group 4 to 15 elements of the periodic table which intercalate and deintercalate lithium ions, as well as oxides, sulfides and nitrides thereof, and carbon materials which are capable of reversibly intercalating and deintercalating lithium ions. When metallic lithium and lithium alloys are used as the negative electrode active material, these may also serve as the current-collecting substrate.

Illustrative examples of the separator include cellulose-based separators and polyolefin-based separators.

The electrolyte may be either a liquid or a solid, and moreover may be either aqueous or non-aqueous, the energy storage device electrode of the invention being capable of exhibiting a performance sufficient for practical purposes even when employed in devices that use a non-aqueous electrolyte.

The non-aqueous electrolyte is exemplified by a non-aqueous electrolyte solution obtained by dissolving an electrolyte salt in a non-aqueous organic solvent. Illustrative examples of the electrolyte salt include lithium salts such as lithium tetrafluoroborate, lithium hexafluorophosphate, lithium perchlorate and lithium trifluoromethanesulfonate; quaternary ammonium salts such as tetramethylammonium hexafluorophosphate, tetraethylammonium hexafluorophosphate, tetrapropylammonium hexafluorophosphate, methyltriethylammonium hexafluorophosphate, tetraethylammonium tetrafluoroborate and tetraethylammonium perchlorate; and lithium imides such as lithium bis(trifluoromethanesulfonyl)imide and lithium bis(fluorosulfonyl)imide. Illustrative examples of non-aqueous organic solvents include alkylene carbonates such as propylene carbonate, ethylene carbonate and butylene carbonate, dialkyl carbonates such as dimethyl carbonate, methyl ethyl carbonate and diethyl carbonate, nitriles such as acetonitrile, and amides such as dimethylformamide.

The configuration of the energy storage device is not particularly limited. Cells of various known configurations, such as cylindrical cells, flat wound prismatic cells, stacked prismatic cells, coin cells, flat wound laminate cells and stacked laminate cells may be used.

When used in a coin cell, the energy storage device electrode of the invention may be die-cut in a specific disk shape and used. For example, a lithium-ion secondary battery may be produced by setting the other electrode that has been die-cut to a specific shape on a coin cell cap to which a washer and a spacer have been welded, laying an electrolyte solution-impregnated separator of the same shape on top thereof, stacking the energy storage device electrode of the invention on top of the separator with the active material layer facing down, placing the coin cell case and a gasket thereon and sealing the cell with a coin cell crimper.

In a stacked laminate cell, use may be made of an electrode assembly obtained by welding metal tabs at, in electrodes where an active material layer has been formed on part or all of the undercoat layer surface, a region of the electrode where the active material layer is not formed (welding region). In this case, the electrodes making up the electrode assembly may each consist of a single plate or a plurality of plates, although a plurality of plates are generally used for both the positive and the negative electrodes. In cases where welding is carried out in a region where the undercoat layer is formed and the active material layer is not formed, the coating weight of the undercoat layer per side of the current-collecting substrate is preferably 0.1 $g/m^2$ or less, more preferably 0.09 $g/m^2$ or less, and even more preferably 0.05 $g/m^2$ or less.

The plurality of electrode plates used to form the positive electrode are preferably stacked in alternation one plate at a time with the plurality of electrode plates that are used to form the negative electrode. It is preferable at this time to interpose the above-described separator between the positive electrode and the negative electrode.

Metal tabs may be welded to welding regions on the outermost of the plurality of electrode plates, or metal tabs may be welded between the welding regions on any two adjoining electrode plates. The metal tab material is not particularly limited, provided it is to one that is commonly used in energy storage devices. Examples include metals such as nickel, aluminum, titanium and copper; and alloys such as stainless steel, nickel alloys, aluminum alloys, titanium alloys and copper alloys. From the standpoint of welding efficiency, it is preferable for the tab material to include at least one metal selected from aluminum, copper and nickel. The shape of the metal tabs is preferably foil-like, with the thickness being preferably from about 0.05 mm to about 1 mm.

Known methods for welding together metals may be used as the welding method. Examples include TIG welding, spot welding, laser welding and ultrasonic welding. In cases where welding is carried out in a region where an undercoat layer is formed and an active material layer is not formed, because the undercoat layer of the invention is set to a coating weight that is particularly suitable for ultrasonic welding, it is preferable to join together the electrodes and the metal tabs by ultrasonic welding.

Ultrasonic welding methods are exemplified by a technique in which a plurality of electrode plates are placed between an anvil and a horn, the metal tabs are placed at the welding regions, and welding is carried out collectively at one time by the application of ultrasonic energy; and a technique in which the electrode plates are first welded together, following which the metal tabs are welded. In this invention, with either of these techniques, not only are the metal tabs and electrodes welded together at the welding regions, the plurality of electrode plates are ultrasonically welded to each other. The pressure, frequency, output power, treatment time, etc. during welding are not particularly limited, and may be suitably set while taking into account the material to be used, the presence or absence of an undercoat layer at the welding region, and the coating weight and other characteristics of the undercoat layer.

A laminate cell can be obtained by placing the electrode assembly produced as described above within a laminate pack, injecting the electrolyte solution described above, and subsequently heat sealing.

EXAMPLES

Preparation Examples, Working Examples and Comparative Examples are given below to more fully illustrate the invention, although the invention is not limited by these Examples. In the Examples, the equipment and conditions used when preparing specimens and analyzing their properties were as follows.
(1) Probe-type ultrasonicator:
  Equipment: UIP1000 (Hielscher Ultrasonics GmbH)
(2) Wire bar coater:
  Equipment: PM-9050MC (SMT Co., Ltd.)
(3) Charge/discharge measurement system:
  Equipment: TOSCAT 3100 (Toyo System Co., Ltd.)
(4) Homogenizing disperser
  Equipment: T.K. Robomix (with Homogenizing Disperser model 2.5 (32 mm dia.)), from Primix Corporation
(5) Thin-film spin-type high-speed mixer
  Equipment: Filmix model 40 (Primix Corporation)
(6) Planetary centrifugal mixer
  Equipment: Thinky Mixer ARE-310 (Thinky)
(7) Roll press
  Equipment: HSR-60150H ultra-small desktop hot roll press (Hohsen Corporation)
(8) Coin Cell Crimper
  Equipment: CR 2032 manual coin cell crimper (Hohsen Corporation)

[1] Production of Undercoat Foil

Preparation Example 1

First, 2.0 g of the oxazoline polymer-containing aqueous solution Epocros WS-700 (Nippon Shokubai Co., Ltd.; solids concentration, 25 wt %; $Mw=4\times10^4$; oxazoline group content, 4.5 mmol/g) as the dispersant was mixed together with 47.5 g of distilled water, and 0.5 g of MWCNTs (NC7000, from Nanocyl; diameter, 10 nm) was mixed therein. The resulting mixture was ultrasonically treated for 30 minutes at room temperature using a probe-type ultrasonicator, thereby giving a black MWCNT-containing dispersion in which MWCNTs were uniformly dispersed and which was free of precipitate.

Next, 0.7 g of the ammonium polyacrylate-containing aqueous solution Aron A-30 (solids concentration, 31.6 wt %; from Toagosei Co., Ltd.), 0.2 g of sodium alginate (Kanto Chemical Co., Ltd.; extra pure reagent) and 49.1 g of distilled water were added to 50 g of the resulting MWCNT-containing dispersion and stirring was carried out, giving Undercoat Slurry A1.

The resulting Undercoat Slurry A1 was uniformly spread with a wire bar coater (OSP 30, wet film thickness, 30 μm) onto aluminum foil (thickness, 15 μm) as the current-collecting substrate and subsequently dried for 20 minutes at 150° C. to form an undercoat layer, thereby producing Undercoat Foil B1. Twenty pieces of the undercoat foil cut to dimensions of 5 cm×10 cm were prepared and their weights were measured, following which the weight of the metal foil from which the undercoat layer had been rubbed off using paper permeated with 0.5 mol/L hydrochloric acid was measured. The coating weight of the undercoat layer, as calculated from the weight difference before and after rubbing off the undercoat layer, was 0.302 g/m².

Preparation Example 2

Aside from using a wire bar coater (OSP4; wet film thickness, 4 μm), Undercoat Foil B2 was produced in the same way as in Preparation Example 1. The coating weight of Undercoat Foil B2 was calculated and found to be 0.044 g/m².

Preparation Example 3

Aside from using acetylene black (AB) (Denka Black, from Denka Company, Ltd.) instead of MWCNTs, Undercoat Foil B3 was produced in the same way as in Preparation Example 1. The coating weight of Undercoat Foil B3 was calculated and found to be 0.329 g/m².

Preparation Example 4

Aside from using AB instead of MWCNTs, Undercoat Foil B4 was produced in the same way as in Preparation Example 2. The coating weight of Undercoat Foil B4 was calculated and found to be 0.052 g/m².

[2] Production of Electrode and Lithium-Ion Battery Using $TiO_2(B)$ as Active Material Working Example 1

The following were mixed together in a homogenizing disperser at 6,000 rpm for 5 minutes: 9.53 g of $TiO_2(B)$ synthesized by the method described in *J. Electrochem. Soc.*, 159(1), A49-A54 (2012) as the active material, 0.378 g of an aqueous dispersion of styrene-butadiene rubber (SBR) (48.5 wt %; TRD2001, from JSR Corporation) as the binder, 0.183 g of carboxymethylcellulose ammonium salt ($NH_4CMC$; DN-800H, from Daicel Corporation) as the thickener, and 19.9 g of deionized water. Next, using a thin-film spin-type high-speed mixer, mixing treatment was carried out for 60 seconds at a peripheral speed of 25 m/s, in addition to which deaeration was carried out for 30 seconds at 2,200 rpm in a planetary centrifugal mixer, thereby producing an electrode slurry (solids concentration, 33 wt %; $TiO_2(B)$:SBR: $NH_4CMC$=104:2:2 (weight ratio).

The resulting electrode slurry was uniformly spread (wet film thickness, 200 μm) onto Undercoat Foil B1 produced in Preparation Example 1, following which the slurry was dried at 80° C. for 30 minutes and then at 120° C. for 30 minutes, thereby forming an active material layer on the undercoat layer. The active material layer was then pressed with a roll press, producing Electrode C1 having an active material layer thickness of 45 μm.

The Electrode C1 thus obtained was die-cut in the shape of a 10 mm diameter disk and the weight was measured, following which the electrode disk was vacuum dried at 100° C. for 15 hours and then transferred to a glovebox filled with argon.

A stack of six pieces of lithium foil (Honjo Chemical Corporation; thickness, 0.17 mm) that had been die-cut to a diameter of 14 mm was set on a 2032 coin cell (Hohsen Corporation) cap to which a washer and a spacer had been welded, and one piece of separator (Celgard 2400) die-cut to a diameter of 16 mm that had been permeated for at least 24 hours with an electrolyte solution (Kishida Chemical Co., Ltd.; an ethylene carbonate:diethyl carbonate=1:1 (volume ratio) solution containing 1 mol/L of lithium hexafluorophosphate as the electrolyte) was laid on the foil. The Electrode C1 was then placed on top thereof with the active material-coated side facing down. One drop of electrolyte solution was deposited thereon, after which the coin cell case and gasket were placed on top and sealing was carried out with a coin cell crimper. The cell was then left at rest for 24 hours, giving a secondary battery for testing.

Working Example 2

Aside from using Undercoat Foil B2 produced in Preparation Example 2 instead of Undercoat Foil B1, Electrode C2 and a secondary battery for testing were successively produced in the same way as in Working Example 1

Comparative Example 1

Aside from using Undercoat Foil B3 produced in Preparation Example 3 instead of Undercoat Foil B1, Electrode C3 and a secondary battery for testing were successively produced in the same way as in Working Example 1

Comparative Example 2

Aside from using Undercoat Foil B4 produced in Preparation Example 4 instead of Undercoat Foil B1, Electrode C4 and a secondary battery for testing were successively produced in the same way as in Working Example 1

Comparative Example 3

Aside from using pure aluminum foil instead of Undercoat Foil B1, Electrode C5 and a secondary battery for testing were successively produced in the same way as in Working Example 1.

Figure 2:
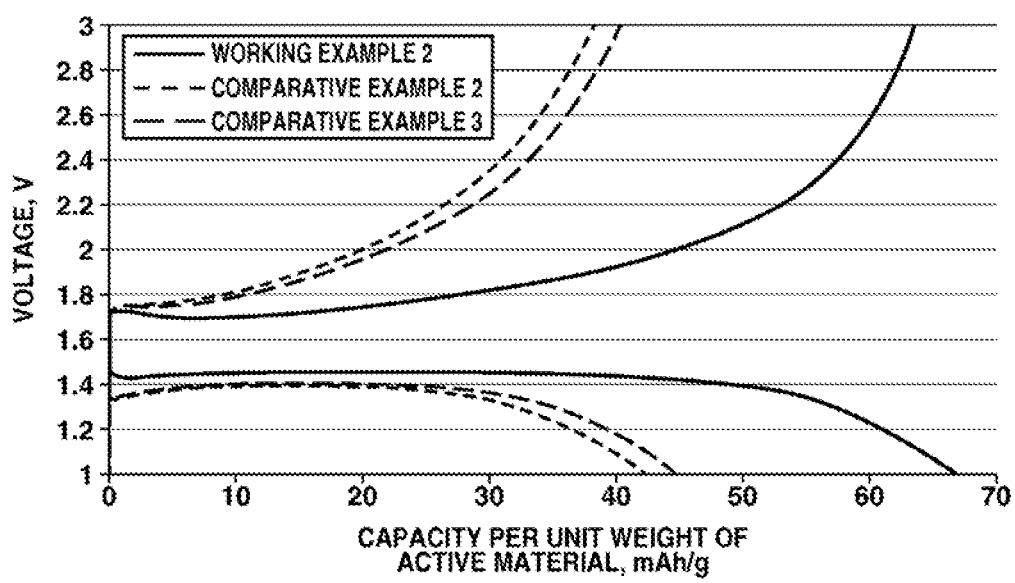
FIG. 2 shows the charge-discharge curves at 0.5 C in Working Example 2 and Comparative Examples 2 and 3.

The electrode characteristics for the lithium-ion secondary batteries produced in Working Examples 1 and 2 and Comparative Examples 1 to 3 were evaluated under the following conditions using a charge/discharge measurement system. FIG. 1 shows charge-discharge curves at 0.5 C in Working Example 1 and Comparative Examples 1 and 3, FIG. 2 shows charge-discharge curves at 0.5 C in Working Example 2 and Comparative Examples 2 and 3, and Table 1 shows the percent capacity retention at various discharge rates with respect to the discharge capacity during 0.1 C discharge.

[Measurement Conditions]
Current: Constant-current charging at 0.5 C, constant-current discharging at 0.5 C, 1 C, 3 C, 5 C, 10 C and 20 C
(the capacity of $TiO_2(B)$ was treated as 336 mAh/g; after initially carrying out 5 charge-discharge cycles at 0.1 C, the rate of charge was set to 0.5 C and the rate of discharge was raised every 5 cycles, following which the discharge rate was ultimately returned to 0.5 C)
Cut-off voltage: 3.00 V-1.00 V
Temperature: Room temperature

TABLE 1

| | | Conductive material | Coating weight (g/m²) | Discharge capacity retention (%) relative to discharge at 0.1 C | | | | | | |
|---|---|---|---|---|---|---|---|---|---|---|
| | | | | 0.1 C | 0.5 C | 1 C | 3 C | 5 C | 10 C | 20 C |
| Working Example | 1 | MWCNT | 0.302 | 100.0 | 49.4 | 29.6 | 16.7 | 11.7 | 5.4 | 2.9 |
| | 2 | MWCNT | 0.044 | 100.0 | 51.1 | 30.9 | 16.9 | 11.9 | 4.9 | 2.9 |
| Comparative Example | 1 | AB | 0.329 | 100.0 | 41.6 | 23.2 | 12.6 | 8.9 | 4.5 | 2.8 |
| | 2 | AB | 0.052 | 100.0 | 32.3 | 18.8 | 9.8 | 6.5 | 3.0 | 1.5 |
| | 3 | none | — | 100.0 | 34.2 | 19.9 | 10.4 | 7.1 | 3.2 | 1.8 |

As shown in FIGS. 1 and 2, in charging and discharging at 0.5 C, the secondary battery produced in Comparative Example 3 using pure aluminum foil had a charge/discharge capacity of only about 40 mAh/g, whereas the secondary batteries produced in Working Examples 1 and 2 that used an undercoat foil containing MWCNTs had a charge/discharge capacity of about 65 mAh/g even at a low coating weight. On the other hand, in the secondary batteries produced in Comparative Examples 1 and 2 that used undercoat foils containing AB, at a coating weight of 0.329 g/m², the charge/discharge capacity was only about 55 mAh/g; in particular, at a low coating weight of 0.052 g/m², the capacity obtained was only about the same as that obtained using pure aluminum foil. Also, as shown in Table 1, in secondary cells that used an undercoat foil containing MWCNTs, compared with pure aluminum foil, a high discharge capacity was maintained at each of the discharge rates up to 20 C. Hence, it is apparent that, in secondary batteries which use $TiO_2(B)$, an undercoat foil that contains MWCNTs can maintain the capacity at high discharge rates, particularly when the coating weight is low.

The invention claimed is:

1. An electrode for an energy storage device, comprising a current-collecting substrate, a carbon nanotube-containing undercoat layer formed on at least one side of the current-collecting substrate, and an active material layer that includes a titanium-containing oxide-containing active material and is formed on a surface of the undercoat layer,
wherein the undercoat layer includes a carbon nanotube dispersant made of a pendant oxazoline group-containing polymer, and
wherein the polymer is obtained by radical polymerization of an oxazoline monomer of formula (1) below

[Chem. 1]

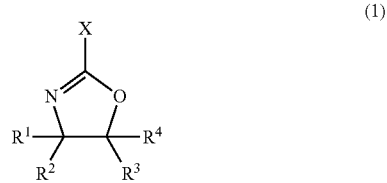

(1)

wherein X is a polymerizable carbon-carbon double bond-containing group, $R^1$ to $R^4$ are each independently a hydrogen atom, a halogen atom, a linear, branched or cyclic alkyl group of 1 to 5 carbon atoms, an aryl group of 6 to 20 carbon atoms or an aralkyl group of 7 to 20 carbon atoms.

2. The energy storage device electrode of claim 1, wherein the titanium-containing oxide is titanium oxide.

3. The energy storage device electrode of claim 2, wherein the titanium oxide is titanium oxide having a bronze-type crystal structure.

4. The energy storage device electrode of claim 1, wherein the undercoat layer has a coating weight per side of the current-collecting substrate of not more than 0.1 g/m$^2$.

5. An energy storage device comprising the energy storage device electrode of claim 1.

6. The energy storage device of claim 5, wherein the energy storage device electrode is a negative electrode.

7. The energy storage device of claim 5 or 6, wherein the energy storage device is a lithium-ion secondary battery.

8. A method for producing the energy storage device electrode of claim 1, comprising the steps of applying an electrode slurry prepared by mixing together a titanium-containing oxide, a binder and an optional thickener using water as a dispersant onto the surface of a carbon nanotube-containing undercoat layer formed on at least one side of a current-collecting substrate; and drying the applied slurry.

* * * * *